United States Patent
Nakanishi et al.

(10) Patent No.: US 11,226,036 B2
(45) Date of Patent: Jan. 18, 2022

(54) SHIFT DEVICE

(71) Applicants: KABUSHIKI KAISHA TOKAI-RIKA-DENKI-SEISAKUSHO, Aichi (JP); NISSAN MOTOR CO., LTD., Kanagawa (JP)

(72) Inventors: Kenji Nakanishi, Aichi (JP); Naoyuki Tanaka, Aichi (JP)

(73) Assignees: KABUSHIKI KAISHA TOKAI-RIKA-DENKI-SEISAKUSHO, Aichi (JP); NISSAN MOTOR CO., LTD., Kanagawa (JP)

( * ) Notice: Subject to any disclaimer, the term of this patent is extended or adjusted under 35 U.S.C. 154(b) by 144 days.

(21) Appl. No.: 16/094,145

(22) PCT Filed: Apr. 3, 2017

(86) PCT No.: PCT/JP2017/014005
§ 371 (c)(1),
(2) Date: Oct. 16, 2018

(87) PCT Pub. No.: WO2017/183435
PCT Pub. Date: Oct. 26, 2017

(65) Prior Publication Data
US 2019/0128410 A1    May 2, 2019

(30) Foreign Application Priority Data
Apr. 20, 2016  (JP) .............................. JP2016-084722

(51) Int. Cl.
*F16H 59/02*  (2006.01)
*F16H 59/10*  (2006.01)
(Continued)

(52) U.S. Cl.
CPC .............. *F16H 61/22* (2013.01); *B60K 20/02* (2013.01); *F16H 59/0278* (2013.01);
(Continued)

(58) Field of Classification Search
CPC ........ B60K 20/02; B60K 20/04; B60K 20/06; B60K 20/08; F16H 59/0278;
(Continued)

(56) References Cited

U.S. PATENT DOCUMENTS 5,582,073 A * 12/1996 Takeuchi ................ F16H 59/10
116/28.1
6,339,968 B1    1/2002 Nagashima
(Continued)

FOREIGN PATENT DOCUMENTS

DE    102012210810 A1 *  1/2014   ............ F16H 61/22
JP    S64-035412    3/1989
(Continued)

OTHER PUBLICATIONS

International Search Report and Written Opinion issued in corresponding International Application No. PCT/JP2017/014005 dated Jun. 20, 2017.

*Primary Examiner* — Jake Cook
*Assistant Examiner* — Gregory Robert Weber
(74) *Attorney, Agent, or Firm* — Roberts Calderon Safran & Cole P.C.

(57) ABSTRACT

A shift lever device is provided with retention frames at a front side and rear side of a lever, and a plate is provided with blocks at the front side and rear side of the lever. Even if the plate and the lever are installed to a vehicle with the front side and rear side of the plate and the lever reversed, changing the retention frame that retains a detent rod enables the block on the side of the detent rod to restrict swinging of the detent rod, enabling swinging of the lever to be restricted. This thereby enables the plate and the lever to be commonly employed.

9 Claims, 5 Drawing Sheets

(51) Int. Cl.
    *F16H 61/22*    (2006.01)
    *F16H 63/38*    (2006.01)
    *B60K 20/02*    (2006.01)

(52) U.S. Cl.
    CPC ........... *F16H 59/105* (2013.01); *F16H 63/38* (2013.01); *F16H 2059/026* (2013.01); *F16H 2059/0282* (2013.01)

(58) Field of Classification Search
    CPC .. F16H 59/105; F16H 63/38; F16H 2059/026; F16H 2059/0282; F16H 51/24; F16H 61/22
    USPC ...................................................... 74/473.21
    See application file for complete search history.

(56) References Cited

U.S. PATENT DOCUMENTS

| | | | |
|---|---|---|---|
| 6,431,339 B1 * | 8/2002 | Beattie | F16H 59/0204 192/220.4 |
| 6,852,065 B2 * | 2/2005 | Yamada | F16H 59/0204 477/99 |
| 2002/0029951 A1 | 3/2002 | Beattie et al. | |
| 2004/0162185 A1 | 8/2004 | Giefer et al. | |
| 2007/0068325 A1 | 3/2007 | Rudelic et al. | |
| 2007/0137366 A1 | 6/2007 | Esaki et al. | |
| 2014/0116177 A1 * | 5/2014 | Patzold | F16H 61/22 74/473.24 |

FOREIGN PATENT DOCUMENTS

| | | |
|---|---|---|
| JP | S64-043421 | 3/1989 |
| JP | H09-014412 | 1/1997 |

* cited by examiner

SHIFT DEVICE

CROSS-REFERENCE TO RELATED APPLICATIONS

The present application is a U.S. National Phase of PCT/JP2017/014005 filed on Apr. 3, 2017, claiming priority to Japanese Patent Application No. 2016-084722 filed Apr. 20, 2016. The disclosure of the PCT Application is hereby incorporated by reference into the present Application.

TECHNICAL FIELD

The present invention relates to a shift device in which a shift body is operated to change a shift position of the shift body.

BACKGROUND ART

In a shift lever device disclosed in Japanese Patent Application Laid-Open (JP-A) No. H09-14412, a shift lever is capable of being operated toward a front side or a rear side, and a detent pin is retained by the shift lever. Movement of the detent pin is restricted by a detent plate of a shift lever plate, thereby restricting operation of the shift lever.

In such a shift lever device, it would be preferable for a shift lever plate (including a detent plate) and a shift lever to be capable of being commonly employed, even were the shift lever plate and the shift lever to be installed in a vehicle with the front side and rear side reversed.

SUMMARY OF INVENTION

Technical Problem

In consideration of the above circumstances, an object of the present invention is to obtain a shift device in which a support body and a shift body are capable of being commonly employed even when the support body and the shift body are installed in a vehicle with one side and another side reversed.

Solution to Problem

A shift device of a first aspect of the present invention includes a support body, a shift body, a restriction portion, and a restriction body. The support body is configured for installation to a vehicle. The shift body is supported by the support body, and is operated toward one side or another side to change a shift position. The restriction portion is provided at the support body on the one side and the other side of the shift body. The restriction body is disposed at the shift body, and is capable of moving together with operation of the shift body. In cases in which the restriction body is disposed on the one side of the shift body, the restriction body is restricted from moving by the restriction portion on the one side so as to restrict operation of the shift body toward a shift position on the one side, and, in cases in which the restriction body is disposed on the other side of the shift body, the restriction body is restricted from moving by the restriction portion on the other side so as to restrict operation of the shift body toward a shift position on the other side.

A shift device of a second aspect of the present invention is the shift device of the first aspect of the present invention, further including a retention portion that is provided on the one side and the other side of the shift body, that retains the restriction body, and that is disposed at the shift body.

A shift device of a third aspect of the present invention is the shift device of the first aspect or the second aspect of the present invention, wherein the restriction body is disposed at both sides of an operation direction of the shift body.

A shift device of a fourth aspect of the present invention is the shift device of any one of the first aspect to the third aspect, wherein the restriction body extends along the shift body.

A shift device of a fifth aspect of the present invention is the shift device of any one of the first aspect to the fourth aspect of the present invention, including a pair of placement bodies that configure the support body, and that are disposed at both sides of an operation direction of the shift body, with the restriction portion provided at only one of the placement bodies.

A shift device of a sixth aspect of the present invention is the shift device of any one of the first aspect to the fifth aspect of the present invention, further including an extension portion that is provided at the support body, that is coupled to the restriction portion, and that extends in an operation direction of the shift body.

A shift device of a seventh aspect of the present invention is the shift device of any one of the first aspect to the sixth aspect of the present invention, wherein the restriction body is interposed between the restriction portion and the shift body when the restriction portion is restricting movement of the restriction body.

A shift device of an eighth aspect of the present invention is the shift device of any one of the first aspect to the seventh aspect of the present invention, further including a placement-maintained portion that is provided at at least one of the support body or the shift body, such that placement of the placement-maintained portion is maintained either on a driving seat side of the shift body or on an opposite side of the shift body from the driving seat when the support body and the shift body are installed in a state in which the one side and the other side of the support body and the shift body are reversed for installation to vehicles having the driving seat in different positions.

A shift device of a ninth aspect of the present invention is the shift device of any one of the first aspect to the eighth aspect of the present invention, further including a restricted portion that is provided extending from the restriction body such that, in cases in which the restricted portion is disposed on the one side of the shift body, the restriction portion on the one side restricts movement of the restricted portion to restrict operation of the shift body toward a shift position on the one side, and, in cases in which the restricted portion is disposed on the other side of the shift body, the restriction portion on the other side restricts movement of the restricted portion to restrict operation of the shift body toward a shift position on the other side.

Advantageous Effects of Invention

In the shift device of the first aspect of the present invention, the support body is installed on the vehicle body side, and the shift body is supported by the support body. The shift body is operated toward the one side and the other side to change the shift position of the shift body. The restriction body is disposed at the shift body, and the restriction body is capable of moving together with operation of the shift body. The restriction portion of the support body restricts movement of the restriction body, thereby restricting operation of the shift body.

The restriction portion is provided at the support body on the one side and the other side of the shift body. In cases in which the restriction body is disposed on the one side of the shift body, the restriction portion on the one side restricts movement of the restriction body, thereby restricting operation of the shift body toward a shift position on the one side. In cases in which the restriction body is disposed on the other side of the shift body, the restriction portion on the other side restricts movement of the restriction body, thereby restricting operation of the shift body toward a shift position on the other side.

Accordingly, changing the placement of the restriction body on the shift body enables the restriction portion to restrict movement of the restriction body, even if the one side and the other side of the support body and the shift body are reversed when installed to a vehicle. The support body and the shift body are thereby capable of being commonly employed.

In the shift device of the second aspect of the present invention, the restriction body is disposed at the shift body with the restriction body retained by the retention portion of the shift body.

Note that the retention portion is provided on the one side and the other side of the shift body. This enables the restriction body to be disposed on the one side of the shift body by retaining the restriction body with the retention portion on the one side, and also enables the restriction body to be disposed on the other side of the shift body by retaining the restriction body with the retention portion on the other side.

In the shift device of the third aspect of the present invention, the restriction body is disposed at both the sides of the operation direction of the shift body. This thereby enables movement of the restriction body to be restricted at both the sides of the operation direction of the shift body by the restriction portion.

In the shift device of the fourth aspect of the present invention, the restriction body extends along the shift body. This thereby enables the maximum separation distance between the restriction body and the shift body to be reduced.

In the shift device of the fifth aspect of the present invention, the pair of placement bodies configure the support body, and are disposed at both the sides of the operation direction of the shift body.

The restriction portion is provided at only one of the pair of placement bodies. This thereby enables the strength of the restriction portion to be raised.

In the shift device of the sixth aspect of the present invention, the extension portion is provided at the support body, and the extension portion is coupled to the restriction portion and extends in the operation direction of the shift body. The extension portion is thus capable of effectively reinforcing the restriction portion.

In the shift device of the seventh aspect of the present invention, the restriction body is interposed between the restriction portion and the shift body when the restriction portion is restricting movement of the restriction body. This thereby enables load input to the restriction body from the restriction portion to be supported by the shift body, enabling damage to the restriction body to be suppressed.

In the shift device of the eighth aspect of the present invention, the placement-maintained portion is provided at at least one of the support body or the shift body. The placement of the placement-maintained portion is maintained either on the driving seat side of the shift body or on the opposite side of the shift body from the driving seat when the support body and the shift body are installed in a state in which the one side and the other side of the support body and the shift body are reversed for installation to vehicles having the driving seat in different positions. The support body and the shift body can accordingly be installed in vehicles having the driving seat in different positions by reversing the one side and the other side of the support body and the shift body.

In the shift device of the ninth aspect of the present invention, the restricted portion is provided extending from the restriction body. In cases in which the restricted portion is disposed on the one side of the shift body, the restriction portion on the one side restricts movement of the restricted portion to restrict operation of the shift body toward a shift position on the one side. In cases in which the restricted portion is disposed on the other side of the shift body, the restriction portion on the other side restricts movement of the restricted portion to restrict operation of the shift body toward a shift position on the other side.

Accordingly, even when the support body and the shift body are installed to a vehicle with the one side and the other side of the support body and the shift body reversed, the placement of the restricted portion with respect to the shift body can be changed by changing the placement of the restriction body with respect to the shift body, thereby enabling the restriction portion to restrict movement of the restricted portion, enabling movement of the restriction body to be restricted, and thus enabling the restriction body to be commonly employed.

DESCRIPTION OF EMBODIMENTS

Shift Lever Device for Left-Hand Drive Vehicle

Figure 1:
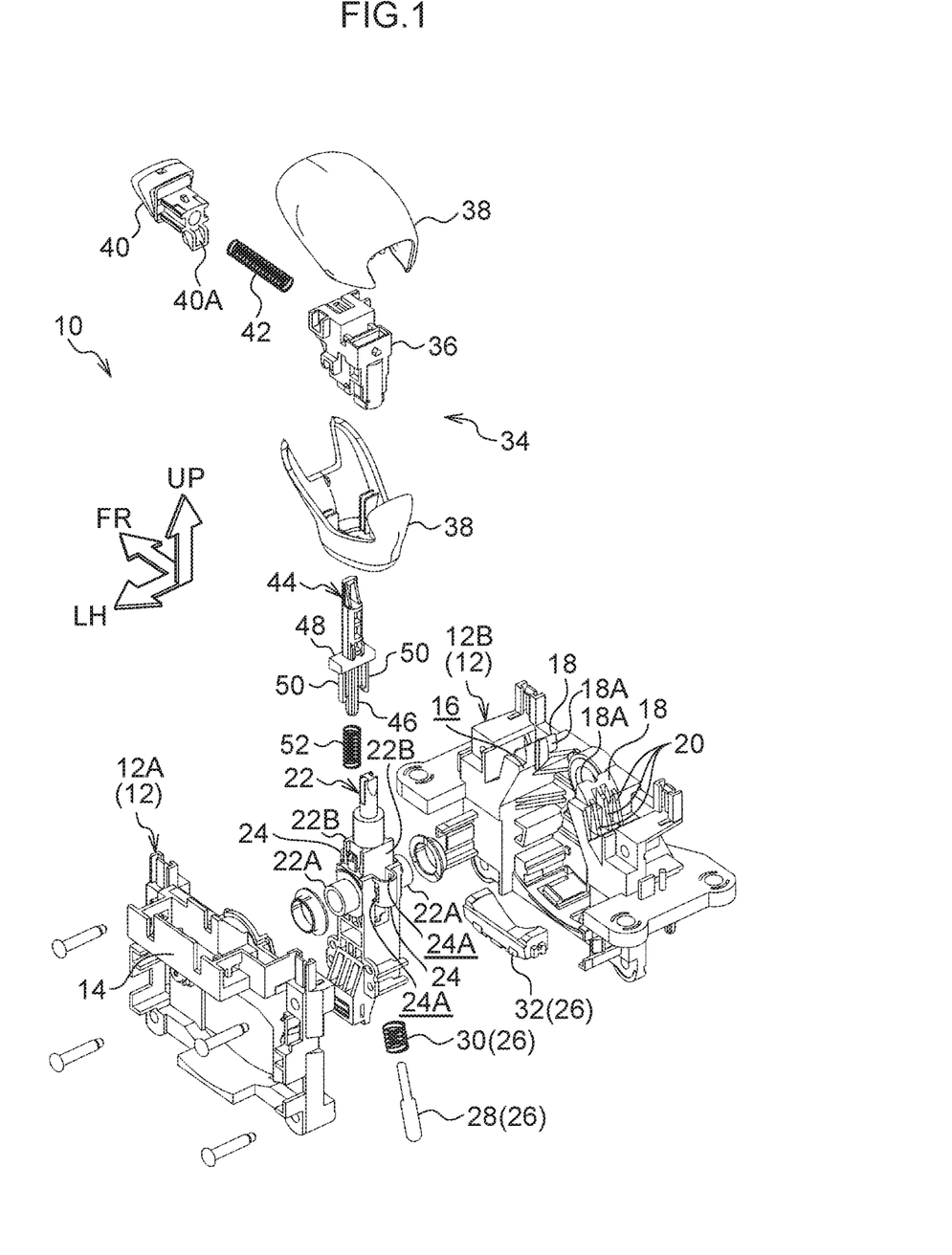
FIG. 1 is an exploded perspective view illustrating a shift lever device according to an exemplary embodiment of the present invention when employed in a left-hand drive vehicle, as viewed from the oblique rear left (vehicle left and vehicle rear).
Figure 2:
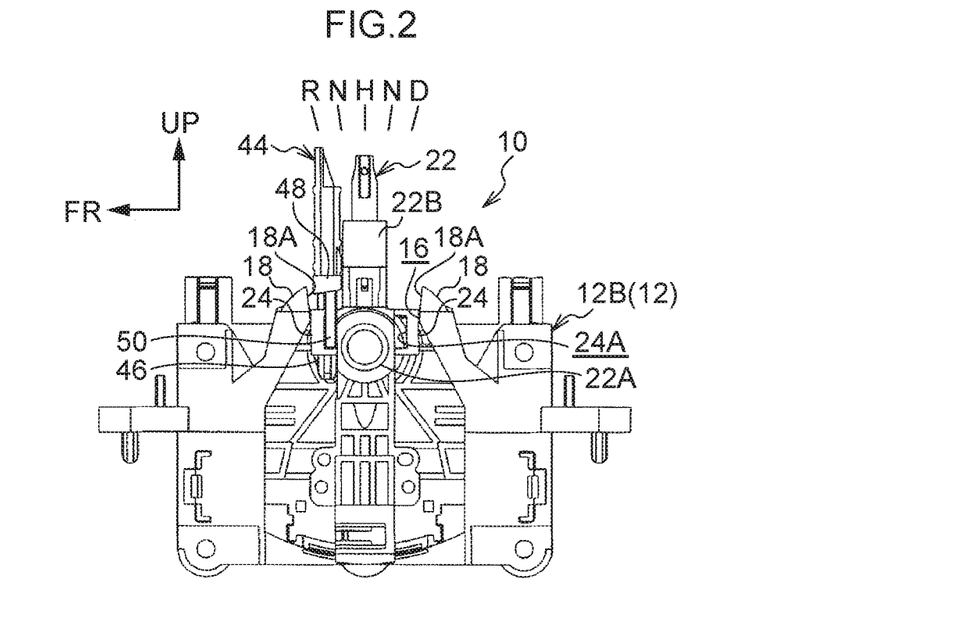
FIG. 2 is a side view illustrating relevant portions of the shift lever device according to the exemplary embodiment of the present invention when employed in the left-hand drive vehicle, as viewed from the left (vehicle left).

FIG. 1 is an exploded perspective view viewed from the oblique rear left (vehicle left and vehicle rear) of a shift lever device 10, serving as a shift device according to an exemplary embodiment of the present invention. FIG. 2 is a side view illustrating relevant portions of the shift lever device 10 as viewed from the left (vehicle left). In FIG. 1 to FIG. 5, the arrow FR indicates the front of the shift lever device 10 (vehicle front), the arrow LH indicates the left of the shift lever device 10 (vehicle left), and the arrow UP indicates an upward direction of the shift lever device 10 (vehicle upward direction).

The shift lever device 10 according to the present exemplary embodiment is what is referred to as a straight, shift-by-wire shift device.

The shift lever device 10 is installed in a left-hand drive vehicle (automobile). In a left-hand drive vehicle, the steering wheel (not illustrated in the drawings) and the driving seat (not illustrated in the drawings) are disposed in the left side of a vehicle cabin. The shift lever device 10 is floor-mounted, and is installed on a floor (vehicle body side) of the vehicle cabin on the right side of the driving seat. The front, left, and upward directions of the shift lever device 10 respectively correspond to the front, left, and upward directions of the vehicle.

As illustrated in FIG. 1 and FIG. 2, the shift lever device 10 is provided with a substantially rectangular box shaped plate 12 (housing) that is made from resin and serves as a support body. The plate 12 is installed (fixed) to the floor of the vehicle cabin.

A substantially rectangular box shaped first plate 12A, serving as a placement body (first placement body) is provided at a left end portion of the plate 12. The interior of the first plate 12A is open toward the left side. A front-rear direction central portion of an upper portion of the first plate 12A is integrally provided with a substantially rectangular box shaped installation box 14, serving as a placement-maintained portion. The interior of the installation box 14 is open toward the upper side, and the installation box 14 has a profile with plane symmetry about a plane running perpendicular to the front-rear direction and located at the front-rear direction center of the installation box 14. An indicator (not illustrated in the drawings) is installed inside the installation box 14, and a shift pattern (a shift position changing path of a lever 22, described later) of the shift lever device 10 is displayed on an upper face of the indicator. The indicator may be installed in the installation box 14 with its front side and rear side reversed.

A portion of the plate 12 not including the left end portion is provided with a substantially rectangular box shaped second plate 12B, serving as a placement body (second placement body). The interior of the second plate 12B is open toward the left side. The second plate 12B is assembled to the right side of the first plate 12A, and the interior of the second plate 12B is in communication with the interior of the first plate 12A. A front-rear direction central portion of an upper wall of the second plate 12B is penetrated by a substantially rectangular opening 16. The opening 16 opens the interior of the plate 12 (the interior of the second plate 12B) toward the upper side, and the front-rear direction position of the front-rear direction center of the opening 16 is aligned with the front-rear direction center of the installation box 14 of the first plate 12A.

A pair of substantially triangular column shaped blocks 18, serving as restriction portions, are integrally provided to an upper side of the second plate 12B. The pair of blocks 18 are respectively disposed at the front side and rear side of the opening 16 in the second plate 12B. The pair of blocks 18 face each other in the front-rear direction. The pair of blocks 18 have plane symmetry to each other about a plane running perpendicular to the front-rear direction and located at the front-rear direction center of the opening 16. A face on the opening 16 side of each block 18 configures a planar block face 18A, serving as a restriction face. The block face 18A of the block 18 on the front side is inclined toward the front side on progression toward the upper side, and the block face 18A of the block 18 on the rear side is inclined toward the rear side on progression toward the upper side.

At the upper side of the second plate 12B, a predetermined number of substantially triangular plate shaped ribs 20 (three in the present exemplary embodiment), serving as extension portions (reinforcement portions) are provided at the lower side of each block 18 on the opposite side from the opening 16. The predetermined number of ribs 20 are disposed running perpendicular to the left-right direction, and are spaced apart from each other in the left-right direction. A face on the opening 16 side of each rib 20 and a lower face of each rib 20 are integral to the second plate 12B, and the face of each rib 20 on the opposite side from the opening 16 is inclined toward the opposite side from the opening 16 on progression toward the lower side. An upper end portion of each rib 20 is integral to the corresponding block 18, and the ribs 20 reinforce the respective blocks 18.

The lever 22, serving as a shift body, is made of resin and has an elongated rod shape. A lower side portion of the lever 22 is inserted into the plate 12. In a state in which the length direction (axial direction) of the lever 22 is parallel to the up-down direction, the lever 22 is disposed on the opposite side of the installation box 14 and the indicator of the first plate 12A from the driving seat. An up-down direction intermediate portion of the lever 22 is integrally provided with a pair of circular cylinder shaped support shafts 22A. The support shafts 22A are coaxial to one another, and project toward the left side and right side of the lever 22 respectively. The left side and right side support shafts 22A are rotatably supported at respective upper end portions of the first plate 12A and the second plate 12B of the plate 12, and the lever 22 is capable of swinging in the front-rear direction (an operation direction) about the pair of support shafts 22A. The lever 22 can thus be disposed an "R" position (reverse position), an "N" position (neutral position), an "H" position (home position), an "N" position (neutral position), and a "D" position (drive position), these being shift positions on progression from the front side toward the rear side.

Retention frames 24, each having a substantially semicircular cylinder shape closed off at one end, and serving as retention portions, are integrally provided at the front side and rear side of the up-down direction intermediate portion of the lever 22. The front side retention frame 24 and the rear side retention frame 24 have plane symmetry to each other about a plane running perpendicular to the front-rear direction and located at the front-rear direction center of the lever 22. An upper face of each retention frame 24 is open, and a lower end of each retention frame 24 is provided with a lower wall. A cross-shaped through hole (not illustrated in the drawings) is formed penetrating the lower wall of each retention frame 24. Elongated rectangular guide holes 24A, serving as guide portions, are formed penetrating a left end portion and a right end portion of each retention frame 24. The guide holes 24A extend along the up-down direction.

Planar pressing faces 22B, serving as pressing portions, are respectively formed to a front face and a rear face of the up-down direction intermediate portion of the lever 22. The planar pressing faces 22B are disposed at the upper side of the retention frames 24. A portion at the right side and lower side of the lever 22 is formed with a circular insertion hole (not illustrated in the drawings). The insertion hole extends in a direction that progresses downward and toward the right, and is open at a lower side.

An indexing mechanism 26, serving as a urging means, is provided between the plate 12 (second plate 12B) and the lever 22.

The indexing mechanism 26 is provided with a substantially circular column shaped detent pin 28, serving as a moving member. The detent pin 28 is inserted (fitted) into the insertion hole in the lever 22 so as to be coaxial with the insertion hole. A lower side portion of the detent pin 28 projects out from the lever 22 toward the lower side, and a lower side face of the detent pin 28 projects out as a hemispherical face.

A detent spring 30 (coil spring), serving as an urging member, spans between the detent pin 28 and a bottom face (upper side face) of the insertion hole in the lever 22. The detent spring 30 is compressed so as to urge the detent pin 28 toward the lower side.

The indexing mechanism 26 is provided with a block shaped detent slope 32, serving as an indexing member. The detent slope 32 is fixed to a lower right side corner of the interior of the second plate 12B. The detent slope 32 is elongated in the front-rear direction, and an upper side face of the detent slope 32 is abutted by a lower side face of the detent pin 28 as a result of the urging force of the detent spring 30. The upper side face of the detent slope 32 is inclined in directions running toward the lower side on progression from each front-rear direction end side toward the front-rear direction center of the detent slope 32. The lower side face of the detent pin 28 is disposed at the front-rear direction center of the upper side face of the detent slope 32 by the urging force of the detent spring 30, such that the lever 22 is disposed at the "H" position. When applied with a swinging force in the front-rear direction, the lever 22 is capable of swinging in the front-rear direction away from the "H" position, against the urging force of the detent spring 30. When swinging force ceases to act on the lever 22 in a state in which the lever 22 has swung in the front-rear direction away from the "H" position, the lever 22 swings (returns) to the "H" position under the urging force of the detent spring 30.

The lever 22 extends out at the upper side of the plate 12 through a front-rear direction central portion of the opening 16. A substantially spherical knob 34, serving as a grip body, is fixed to an upper end portion of the lever 22.

A substantially rectangular block shaped knob body 36 is provided inside the knob 34. The knob 34 is assembled to an upper end portion of the lever 22 by assembling the knob body 36 to the upper end portion of the lever 22. The knob body 36 can be assembled to the upper end portion of the lever 22 in a state in which the front side and rear side of the knob body 36 have been reversed, and the knob 34 can be assembled to the upper end portion of the lever 22 in a state in which the front side and rear side of the knob 34 have been reversed.

An outer periphery of the knob body 36 is covered by a substantially spherical wall shaped knob cover 38. The knob cover 38 is fixed so as to be integral to the knob body 36. The knob 34 (knob cover 38) can be gripped by an occupant (driver) sitting in the driving seat of the vehicle, and the lever 22 can be swing-operated as a unit with the knob 34 in a state in which the occupant is gripping the knob 34.

A substantially rectangular column shaped button 40, serving as a release portion, is assembled to the knob body 36. The button 40 projects toward the front side from the knob body 36, and is capable of moving in a predetermined front-rear direction range with respect to the knob body 36. A knob spring 42 (coil spring), serving as an urging-release means, spans between the button 40 and the knob body 36. The knob spring 42 is compressed so as to urge the button 40 toward the front side. The button 40 passes through the knob cover 38 so as to be exposed at the front side of the knob cover 38, and the button 40 can be press operated toward the rear side against the urging force of the knob spring 42 by the occupant. A rear side and lower side end portion of the button 40 is integrally provided with a flat plate shaped release plate 40A, serving as a link portion. The release plate 40A is inclined toward the upper side on progression toward the front side.

The retention frame 24 on the front side of the lever 22 retains a substantially rod-shaped detent rod 44, that is made of resin and serves as a restriction body. The length direction of the detent rod 44 is disposed following the length direction of the lever 22. The detent rod 44 has plane symmetry about a plane running perpendicular to the left-right direction and disposed at the left-right direction center of the detent rod 44, and has an asymmetrical shape about a plane running perpendicular to the front-rear direction and disposed at the front-rear direction center of the detent rod 44. The retention frame 24 on the rear side of the lever 22 is capable of retaining the detent rod 44 in a state in which the front side and the rear side of the detent rod 44 have been reversed.

A columnar retention column 46 with a cross-shaped cross-section profile, serving as a retained portion, is provided coaxially with a lower side portion of the detent rod 44. The retention column 46 is inserted from the upper side into the retention frame 24 on the front side of the lever 22, and passes through and fits together with the through hole in the lower wall of the retention frame 24.

The detent rod 44 is integrally provided with a substantially rectangular column shaped detent bar 48, serving as a restricted portion, at the upper side of the retention column 46. The detent bar 48 extends toward the left side and the right side, and is disposed at the front side of the planar pressing face 22B at the front side of the lever 22.

A left side portion and a right side portion of the detent bar 48 are integrally provided with substantially elongated plate shaped guide claws 50, serving as guided portions. The guide claws 50 extend from the detent bar 48 toward the lower side at the right side and left side of the retention column 46. The guide claws 50 are elastic, and lower ends (leading ends) of the guide claws 50 project toward the retention column 46 side. The lower ends of the guide claws 50 are inserted into the respective guide holes 24A in the retention frame 24 at the front side of the lever 22, such that the lower ends of the guide claws 50 are guided in the guide holes 24A so as to be capable of being displaced in the up-down direction.

A rod spring 52 (coil spring), serving as a displacement urging means, spans between the detent bar 48 and the lower wall of the retention frame 24 at the front side of the lever 22. The rod spring 52 is compressed in a state in which the retention column 46 passes through the inside of the rod spring 52, and urges the detent rod 44 toward the upper side.

An upper portion of the detent rod 44 is inserted into the knob 34 (into the knob cover 38). An upper end of the detent rod 44 abuts a lower side face of the release plate 40A of the button 40 of the knob 34 as a result of the urging force of the rod spring 52, thereby limiting upward displacement (sliding) of the detent rod 44. When the button 40 is press operated toward the rear side against the urging force of the knob spring 42 as described above, the upper end of the detent rod 44 slides toward the upper side (front side) along the release plate 40A due to the urging force of the rod spring 52, such that the detent rod 44 is displaced toward the upper side.

Figure 3:
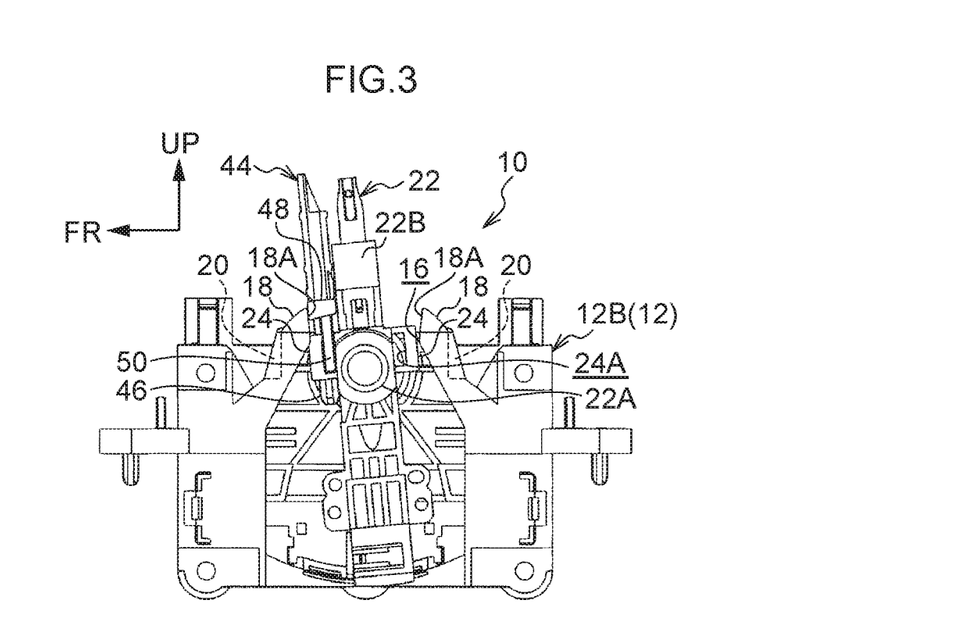
FIG. 3 is a side view illustrating the shift lever device according to the exemplary embodiment of the present invention when employed in the left-hand drive vehicle in a case in which a shift lever has been swung to an "N" position at the front side (vehicle front side), as viewed from the left (vehicle left).

As illustrated in FIG. 3, when the lever 22 is swing operated toward the front side from the "H" position in a state in which the button 40 has not been press operated toward the rear side and the detent rod 44 has not been displaced toward the upper side, the detent bar 48 of the detent rod 44 abuts the block 18 on the front side of the plate 12 (second plate 12B), such that the detent rod 44 is restricted from swinging (moving) toward the front side by the block 18 on the front side. Accordingly, the lever 22 is permitted to swing from the "H" position toward the front side "N" position, but the lever 22 is restricted from swinging from the front side "N" position toward the "R" position. When the detent rod 44 is restricted from swinging toward the front side by the front side block 18, the detent bar 48 is interposed between the front side block 18 and the lever 22 in a state in which a front face and a rear face of the detent bar 48 are respectively in face-on-face contact with the block face 18A of the front side block 18 and the planar pressing face 22B on the front side of the lever 22.

Figure 4:
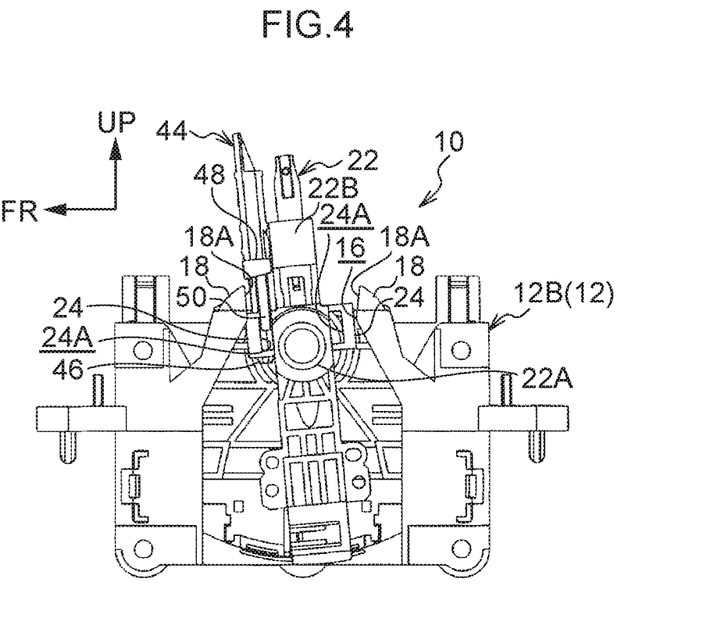
FIG. 4 is a side view illustrating the shift lever device according to the exemplary embodiment of the present invention when employed in the left-hand drive vehicle in a case in which the shift lever has been swung to an "R" position, as viewed from the left (vehicle left).
Figure 5:
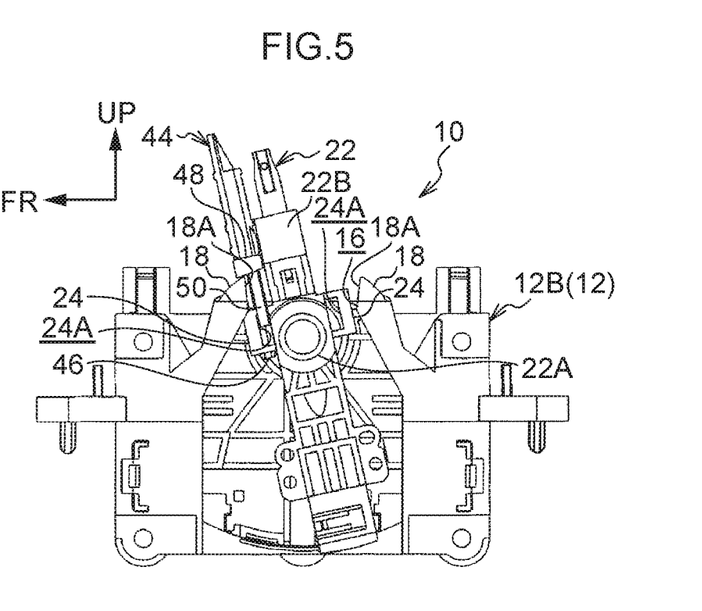
FIG. 5 is a side view illustrating the shift lever device according to the exemplary embodiment of the present invention when employed in the left-hand drive vehicle in a case in which the shift lever has been swung to an "R" position, as viewed from the left (vehicle left).

As illustrated in FIG. 4 and FIG. 5, when the lever 22 is swing operated from the "H" position toward the front side in a state in which the button 40 has been press operated toward the rear side and the detent rod 44 has been displaced toward the upper side, the detent bar 48 is capable of passing over the upper side of the front side block 18. The lever 22 is thus permitted to swing from the "H" position toward the front side "N" position, and the lever 22 is also permitted to swing from the front side "N" position toward the "R" position.

When the lever 22 is swing operated from the "H" position toward the rear side, even in a state in which the button 40 has not been press operated toward the rear side and the detent rod 44 has not been displaced toward the upper side, the detent bar 48 of the detent rod 44 is not abutted by the rear side block 18 of the plate 12 (second plate 12B). Accordingly, the lever 22 is permitted to swing from the "H" position toward the rear side "N" position, and the lever 22 is also permitted to swing from the rear side "N" position toward the "D" position.

Shift Lever Device for Right-Hand Drive Vehicle

Figure 6:
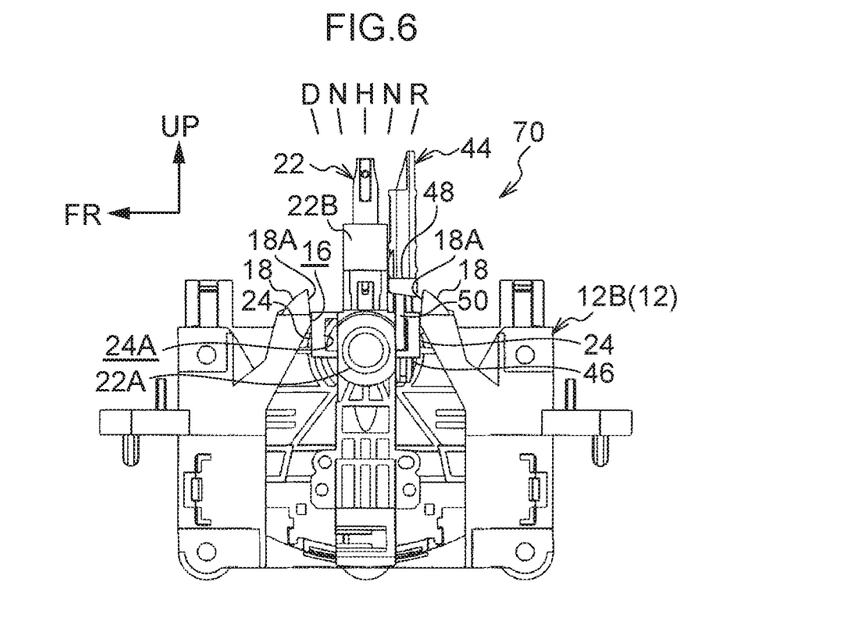
FIG. 6 is a side view illustrating relevant portions of a shift lever device according to the exemplary embodiment of the present invention when employed in a right-hand drive vehicle, as viewed from the left (vehicle right).

FIG. 6 is a side view illustrating relevant portions of a shift lever device 70, serving as a shift device according to the present exemplary embodiment, as viewed from the left (vehicle right). Note that in FIG. 6 to FIG. 9, the arrow FR indicates the front of the shift lever device 70 (vehicle rear), and the arrow UP indicates the upward direction of the shift lever device 70 (vehicle upward direction).

The shift lever device 70 according to the present exemplary embodiment has almost the same configuration as the shift lever device 10, but differs in the following points.

The shift lever device 70 is installed in a right-hand drive vehicle (automobile). In a right-hand drive vehicle, the steering wheel (not illustrated in the drawings) and the driving seat (not illustrated in the drawings) are disposed in the right side of the vehicle cabin. The shift lever device 70 is installed on the floor (vehicle body side) of the vehicle cabin on the vehicle left side of the driving seat. The front, left, and upward directions of the shift lever device 70 respectively correspond to the rear, right, and upward directions of the vehicle.

As illustrated in FIG. 6, in the shift lever device 70, the plate 12, the lever 22, and the indexing mechanism 26 of the shift lever device 10 are installed to the vehicle in a state in which their respective front sides and rear sides are reversed. The lever 22 is capable of being disposed at an "R" position, an "N" position, an "H" position, an "N" position, and a "D" position on progression from the rear side toward the front side. The lever 22 is disposed on the opposite side of the installation box 14 and the indicator of the first plate 12A of the plate 12 from the driving seat, and the indicator of the shift lever device 10 is installed inside the installation box 14 without reversing the front side and the rear side of the indicator.

The knob 34 (knob body 36) of the shift lever device 10 is assembled to the upper end portion of the lever 22 in a state in which the front side and the rear side of the knob 34 have not been reversed. The button 40 of the knob 34 projects from the knob body 36 toward the rear side so as to be exposed at the rear side of the knob cover 38. The button 40 can be press operated toward the front side against the urging force of the knob spring 42 by the occupant, and the release plate 40A of the button 40 is inclined toward the upper side on progression toward the rear side.

The retention frame 24 on the rear side of the lever 22 retains the detent rod 44 of the shift lever device 10 in a state in which the front side and the rear side of the detent rod 44 have not been reversed, and the rod spring 52 spans between the detent bar 48 of the detent rod 44 and the lower wall of the retention frame 24 on the rear side. As described above, when the button 40 is press operated toward the front side against the urging force of the knob spring 42, the upper end of the detent rod 44 slides toward the upper side (rear side) along the release plate 40A of the button 40 due to the urging force of the rod spring 52, such that the detent rod 44 is displaced toward the upper side.

Figure 7:
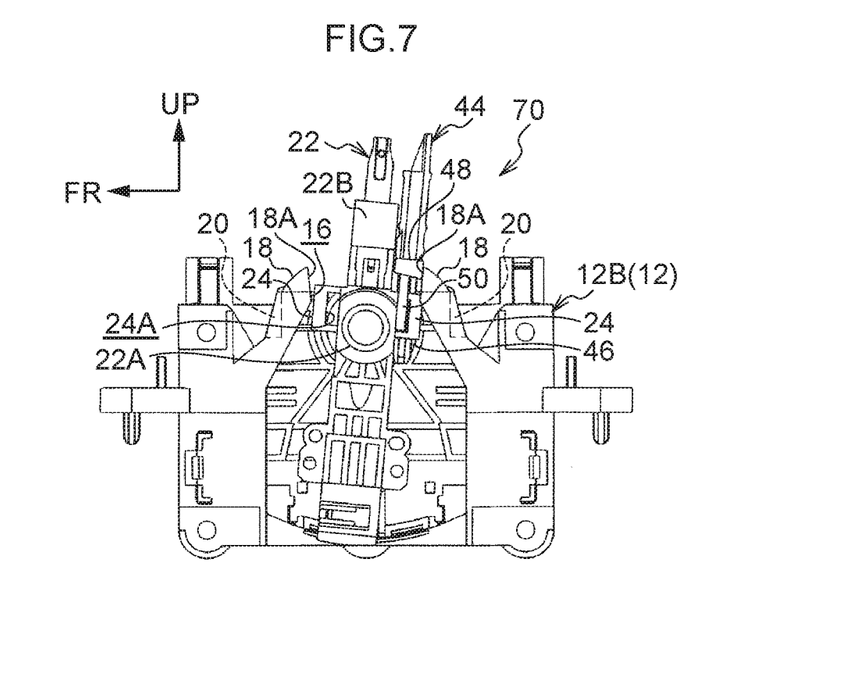
FIG. 7 is a side view illustrating the shift lever device according to the exemplary embodiment of the present invention when employed in the right-hand drive vehicle in a case in which a shift lever has been swung to an "N" position at the rear side (vehicle front side), as viewed from the left (vehicle right).

As illustrated in FIG. 7, when the lever 22 is swing operated from the "H" position toward the rear side in a state in which the button 40 has not been press operated toward the front side and the detent rod 44 has not been displaced toward the upper side, the detent bar 48 of the detent rod 44 abuts the rear side block 18 of the plate 12 (second plate 12B), and the detent rod 44 is restricted from swinging (moving) toward the rear side by the rear side block 18. Accordingly, the lever 22 is permitted to swing from the "H" position toward the rear side "N" position, but the lever 22 is restricted from swinging from the rear side "N" position toward the "R" position. Moreover, when the detent rod 44 is restricted from swinging toward the rear side by the rear side block 18, the detent bar 48 is interposed between the rear side block 18 and the lever 22 in a state in which the rear face and the front face of the detent bar 48 are respectively in face-on-face contact with the block face 18A of the rear side block 18 and the planar pressing face 22B on the rear side of the lever 22.

Figure 8:
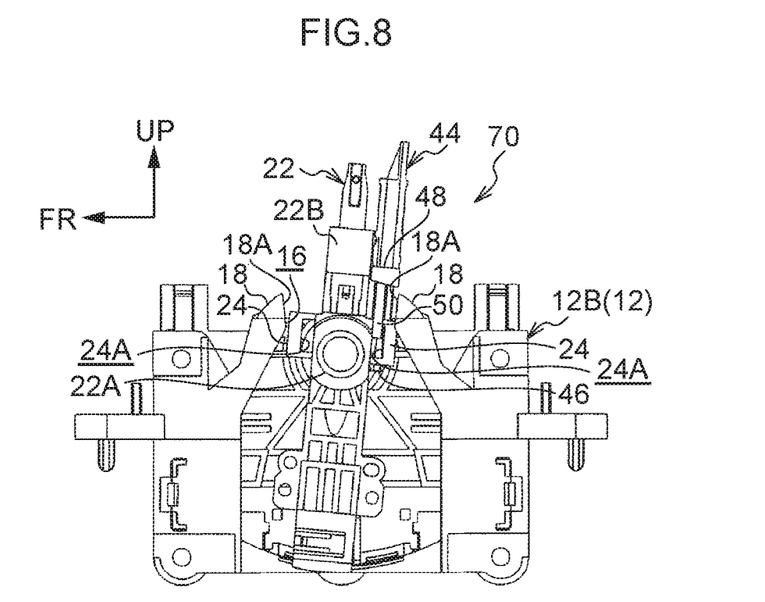
FIG. 8 is a side view illustrating the shift lever device according to the exemplary embodiment of the present invention when employed in the right-hand drive vehicle in a case in which the shift lever has been swung to an "R" position, as viewed from the left (vehicle right).
Figure 9:
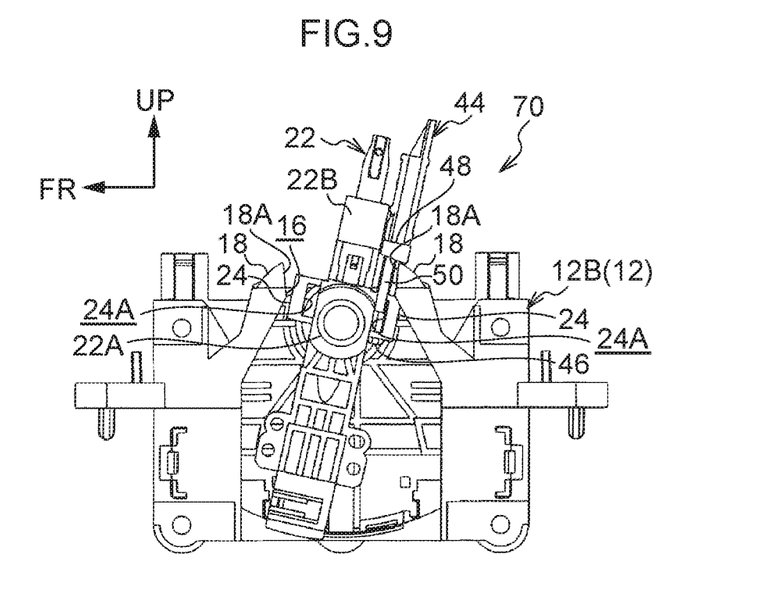
FIG. 9 is a side view illustrating the shift lever device according to the exemplary embodiment of the present invention when employed in the right-hand drive vehicle in a case in which the shift lever has been swung to an "R" position, as viewed from the left (vehicle right).

As illustrated in FIG. 8 and FIG. 9, when the lever 22 is swing operated from the "H" position toward the rear side in a state in which the button 40 has been press operated toward the front side and the detent rod 44 has been displaced toward the upper side, the detent bar 48 is capable of passing over the upper side of the rear side block 18. The lever 22 is thus permitted to swing from the "H" position toward the rear side "N" position, and the lever 22 is also permitted to swing from the rear side "N" position toward the "R" position.

When the lever 22 is swing operated from the "H" position toward the front side, even in a state in which the button 40 has not been press operated toward the front side and the detent rod 44 has not been displaced toward the upper side, the detent bar 48 of the detent rod 44 does not abut the front side block 18 of the plate 12 (second plate 12B). Accordingly, the lever 22 is permitted to swing from the "H" position toward the front side "N" position, and the lever 22 is also permitted to swing from the front side "N" position toward the "D" position.

Advantageous Effects of Present Exemplary Embodiment

The shift lever device 10 and the shift lever device 70 described above are provided with the retention frames 24 at the front side and rear side of the lever 22, and are provided with the blocks 18 at the front side and rear side of the opening 16 in the plate 12. In the shift lever device 10, the detent rod 44 is retained by the retention frame 24 on the front side, and the front side block 18 restricts the detent rod 44 (detent bar 48) from swinging toward the front side, thereby restricting the lever 22 from swinging toward the "R" position at the front side (vehicle front side). In the shift lever device 70, the detent rod 44 is retained by the retention frame 24 on the rear side, and the rear side block 18 restricts the detent rod 44 (detent bar 48) from swinging toward the rear side, thereby restricting the lever 22 from swinging toward the "R" position at the rear side (vehicle front side).

Accordingly, in the shift lever device 10 and the shift lever device 70, even if the plate 12 and the lever 22 are installed to the vehicle with their respective front sides and rear sides reversed, changing the retention frame 24 that retains the detent rod 44 and changing the placement of the detent rod 44 with respect to the lever 22 enables the lever 22 to be restricted from swinging toward the "R" position by the corresponding block 18. This thereby enables the plate 12 and the lever 22 to be commonly employed in both the shift lever device 10 and the shift lever device 70.

Moreover, the retention frame 24 on the front side and the retention frame 24 on the rear side of the lever 22 are capable of retaining the detent rod 44 in a state in which the front side and the rear side of the detent rod 44 have been reversed. Accordingly, in the shift lever device 10 and the shift lever device 70, even if the front side and rear side of the lever 22 have been reversed, both the retention frame 24 on the front side and the retention frame 24 on the rear side are capable of retaining detent rod 44 (including the detent bar 48) in a state in which the front side and the rear side of the detent rod 44 have not been reversed. This thereby enables a common detent rod 44 to be employed in the shift lever device 10 and the shift lever device 70, not only in cases in which the detent rod 44 is configured with plane symmetry about a plane running perpendicular to the front-rear direction and located at the front-rear direction center of the detent rod 44, but also in cases such as that of the present exemplary embodiment, in which the detent rod 44 is asymmetrical about a plane running perpendicular to the front-rear direction and located at the front-rear direction center of the detent rod 44.

Moreover, the knob 34 (knob body 36) is capable of being assembled to the upper end portion of the lever 22 both in a state in which the front side and rear side of the knob 34 have not been reversed, and in a state in which the front side and rear side of the knob 34 have been reversed. This thereby enables the knob 34 (knob body 36) to be assembled to the upper end portion of the lever 22 in a state in which the front side and rear side of the knob 34 have not been reversed even when the front side and the rear side of the lever 22 are reversed so as to correspond to the shift lever device 10 or the shift lever device 70. This thereby enables the knob 34 to be commonly employed in both the shift lever device 10 and the shift lever device 70.

The indicator is capable of being installed inside the installation box 14 of the plate 12 both in a state in which the front side and rear side of the indicator have not been reversed and in a state in which the front side and rear side of the indicator have been reversed. This thereby enables the indicator to be installed in the installation box 14 in a state in which the front side and rear side of the indicator have not been reversed, even when the front side and the rear side of the installation box 14 of the plate 12 are reversed so as to correspond to the shift lever device 10 or the shift lever device 70. This thereby enables the indicator to be commonly employed in both the shift lever device 10 and the shift lever device 70.

In the shift lever device 10, the plate 12 is installed in the left-hand drive vehicle in a state in which the front side and rear side of the plate 12 have not been reversed, and in the shift lever device 70, the plate 12 is installed in the right-hand drive vehicle in a state in which the front side and rear side of the plate 12 have been reversed, thereby enabling the placement of the installation box 14 and the indicator to be maintained on the driving seat side of the lever 22. This thereby enables the plate 12 to be installed in the left-hand drive vehicle and the right-hand drive vehicle by reversing the front side and rear side of the plate 12.

The detent bar 48 of the detent rod 44 and the blocks 18 of the plate 12 are disposed on both left-right direction sides of the lever 22. This thereby enables the blocks 18 to restrict swinging of the detent bar 48 on both left-right direction sides of the lever 22, enabling swinging of the lever 22 toward the "R" position to be effectively restricted.

The length direction of the detent rod 44 is disposed following the length direction of the lever 22. Accordingly, unlike in cases in which the length direction of the detent rod 44 is disposed following a swing-radial direction of the lever 22, the distance between the upper end of the detent rod 44 and the upper end of the lever 22 can be reduced, enabling the knob 34 to be reduced in size in the front-rear direction.

The plate 12 is configured by the first plate 12A and the second plate 12B, and the blocks 18 are provided only to the second plate 12B. Accordingly, unlike in cases in which the blocks 18 are provided split between the first plate 12A and the second plate 12B, the strength of the blocks 18 can be raised, enabling the blocks 18 to effectively restrict swinging of the detent rod 44 (detent bar 48), and enabling the lever 22 to be effectively restricted from swinging toward the "R" position. Moreover, the blocks 18 are integrally provided to the plate 12, enabling a reduction in the number of components, and enabling a reduction in costs.

The ribs 20 of the plate 12 are coupled to the respective blocks 18 on the lever 22 side, and extend from the blocks 18 toward the opposite side from the lever 22 along the swing direction of the lever 22 (front-rear direction). This thereby enables the blocks 18 to be effectively reinforced by the ribs 20, and enables the blocks 18 to effectively restrict swinging of the detent rod 44 (detent bar 48), thereby enabling the lever 22 to be effectively restricted from swinging toward the "R" position.

When the blocks 18 are restricting swinging of the detent rod 44 (detent bar 48), the detent bar 48 is interposed between the block face 18A of the corresponding block 18 and the planar pressing face 22B of the lever 22. This thereby enables the lever 22 to support load input to the detent bar 48 from the block 18, enabling damage to the detent rod 44 to be suppressed.

Moreover, when the blocks 18 are restricting swinging of the detent rod 44 (detent bar 48), the front face and the rear face of the detent bar 48 respectively make face-on-face contact with the block face 18A of the corresponding block 18 and the planar pressing face 22B of the lever 22. This thereby enables the lever 22 to effectively support load input to the detent bar 48 from the block 18, enabling damage to the detent rod 44 to be effectively suppressed.

Modified Examples

In the present exemplary embodiment, the detent bar 48 extends toward the left side and right side of the detent rod 44. However, the detent bar 48 may extend toward the left side (or right side) of the detent rod 44 alone. In such cases, in accordance with the position of the detent bar 48, the front side block 18 of the plate 12 may be provided to a left side portion (or a right side portion) alone, and the rear side block 18 of the plate 12 may be provided to a right side portion (or a left side portion) alone.

Moreover, the detent bar 48 may extend toward the vehicle front side of the detent rod 44. In such cases, the detent bar 48 may be disposed at the vehicle front side of the lever 22 by providing a retention portion only on the left side (or the right side) of the lever 22, and retaining the detent rod 44 with the retention portion. Moreover, the block 18 on the front side of the plate 12 may be provided only on a left side portion (or a right side portion), and the block 18 on the rear side of the plate 12 may be provided only on a right side portion (or a left side portion), in accordance with the position of the detent bar 48. Moreover, in such cases, the detent bar 48 may be disposed at the vehicle front side of the lever 22 by retaining the detent rod 44 at the interior (retention portion) of the lever 22, and the blocks 18 on the front side and rear side of the plate 12 may be provided only on the front side and rear side of the detent bar 48 in accordance with the position of the detent bar 48.

Moreover, in the present exemplary embodiment, the lever 22 is capable of being placed at the "R" position, an "N" position, the "H" position, an "N" position, and the "D" position on progression from the vehicle front side toward the vehicle rear side. However, for example, configuration may be made such that the lever 22 is capable of being placed at an "R" position, an "N" position, and a "D" position on progression from the vehicle front side toward the vehicle rear side. In such cases, the lever 22 may be capable of being placed at an "H" position (placement-maintained portion) on one vehicle width direction side of the "N" position (for example on the opposite side from the driving seat).

Moreover, in the present exemplary embodiment, the plate 12 may be provided with an installation portion serving as a placement-maintained portion on the left side (or the right side) of the lever 22, and a "P" switch (parking switch) serving as a shift operation portion may be installed on the installation portion. The "P" switch is press operated by the occupant to change a shift range of an automatic transmission of the vehicle to a "P" range (parking range). In such cases, the installation portion may be configured with plane symmetry about a plane running perpendicular to the front-rear direction and disposed at the front-rear direction center of the installation portion, such that the "P" switch is capable of being installed to the installation portion in a state in which the front side and rear side of the "P" switch have been reversed. This enables the "P" switch to be disposed on the driving seat side of the lever 22 (or on the opposite side from the driving seat) in both the shift lever device 10 and the shift lever device 70.

Moreover, in the present exemplary embodiment, the shift lever devices 10, 70 have shift-by-wire configurations. However, the shift lever devices 10, 70 may have configurations other than shift-by-wire configurations (for example, mechanical cable type configurations).

Moreover, in the present exemplary embodiment, the shift lever devices 10, 70 are floor-mounted, and are installed to the floor of the vehicle cabin. However, the shift lever devices 10, 70 may be installed to an instrument panel or a steering column in the vehicle cabin.

The disclosure of Japanese Patent Application No. 2016-84722, filed on Apr. 20, 2016, is incorporated in its entirety by reference herein.

EXPLANATION OF REFERENCE NUMERALS

10 shift lever device (shift device)
12 plate (support body)
12A first plate (placement body)
12B second plate (placement body)
14 installation box (placement-maintained portion)
18 block (restriction portion)
20 rib (extension portion)
22 lever (shift body)
24 retention frame (retention portion)
44 detent rod (restriction body)
48 detent bar (restricted portion)
70 shift lever device (shift device)

The invention claimed is:

1. A shift device comprising:
a support body configured for installation to a vehicle;
a shift body that is supported by the support body, and that is operated toward one side or another side to change a shift position;
a restriction portion that is provided at the support body on the one side and the other side of the shift body;
a restriction body that is disposed on one of the one side or the other side of the shift body and is not disposed on another of the one side or the other side, that is capable of moving together with operation of the shift body, that, in cases in which the restriction body is disposed on the one side of the shift body, is restricted from moving by the restriction portion on the one side so as to restrict operation of the shift body toward a shift position on the one side while the restriction portion on the other side is unable to restrict operation of the shift body toward the other side, and that, in cases in which the restriction body is disposed on the other side of the shift body, is restricted from moving by the restriction portion on the other side so as to restrict operation of the shift body toward a shift position on the other side while the restriction portion on the one side is unable to restrict operation of the shift body toward the one side; and a release portion that, in cases in which the restriction body is disposed on the one side of the shift body, is operated such that a movement restriction on the restriction body by the restriction portion on the one side is released, and that, in cases in which the restriction body is disposed on the other side of the shift body, is operated such that a movement restriction on the restriction body by the restriction portion on the other side is released.

2. The shift device of claim 1, further comprising a first retention portion and a second retention portion, the first retention portion being provided on the one side of the shift body, the second retention portion being provided on the other side of the shift body, and the first retention portion or the second retention portion retaining the restriction body such that the restriction body is disposed at the shift body.

3. The shift device of claim 1, wherein the restriction body extends along the shift body.

4. The shift device of claim 1, further comprising a pair of placement bodies that configure the support body, and that are disposed at both lateral sides of an operation direction of the shift body, with the restriction portion provided at only one of the placement bodies.

5. The shift device of claim 1, further comprising an extension portion that is provided at the support body, that is coupled to the restriction portion, and that extends in an operation direction of the shift body.

6. The shift device of claim 1, wherein the restriction body is interposed between the restriction portion and the shift body when the restriction portion is restricting movement of the restriction body.

7. The shift device of claim 1, further comprising a placement-maintained portion that is provided at least one of the support body or the shift body, such that placement of the placement-maintained portion is maintained either on a driving seat side of the shift body or on an opposite side of the shift.

8. The shift device of claim 1, further comprising a restricted portion that is provided extending from the restriction body such that, in cases in which the restricted portion is disposed on the one side of the shift body, the restriction portion on the one side restricts movement of the restricted portion to restrict operation of the shift body toward a shift position on the one side, and, in cases in which the restricted portion is disposed on the other side of the shift body, the restriction portion on the other side restricts movement of the restricted portion to restrict operation of the shift body toward a shift position on the other side.

9. A shift device comprising:

a support body configured for installation to a vehicle;

a shift body that is supported by the support body, and that is operated toward one side or another side to change a shift position;

a restriction portion that is provided at the support body on the one side and the other side of the shift body; and a restriction body that is disposed on one of the one side or the other side of the shift body and is not disposed on another of the one side or the other side, that is capable of moving together with operation of the shift body, that, in cases in which the restriction body is disposed on the one side while the restriction portion on the other side is unable to restrict operation of the shift body toward the other side of the shift body, is restricted from moving by the restriction portion on the one side so as to restrict operation of the shift body toward a shift position on the one side, and that, in cases in which the restriction body is disposed on the other side of the shift body, is restricted from moving by the restriction portion on the other side so as to restrict operation of the shift body toward a shift position on the other side while the restriction portion on the one side is unable to restrict operation of the shift body toward the one side, the one side and the other side of the restriction body being reversed with respect to the shift body between cases in which the restriction body is disposed on the one side of the shift body and cases in which the restriction body is disposed on the other side of the shift body.

* * * * *